United States Patent
Sempere Ferri

(10) Patent No.: US 11,350,792 B2
(45) Date of Patent: Jun. 7, 2022

(54) GRINDING DEVICE FOR SPICE-DISPENSING CONTAINERS

(71) Applicant: PROYECTOS Y EJECUCIONES, S.A., Onil (ES)

(72) Inventor: German Sempere Ferri, Onil (ES)

(73) Assignee: PROYECTOS Y EJECUCIONES, S.A., Onil (ES)

( * ) Notice: Subject to any disclaimer, the term of this patent is extended or adjusted under 35 U.S.C. 154(b) by 0 days.

(21) Appl. No.: 16/645,851

(22) PCT Filed: Sep. 12, 2018

(86) PCT No.: PCT/ES2018/070597
§ 371 (c)(1),
(2) Date: Mar. 10, 2020

(87) PCT Pub. No.: WO2019/053314
PCT Pub. Date: Mar. 21, 2019

(65) Prior Publication Data
US 2020/0260913 A1    Aug. 20, 2020

(30) Foreign Application Priority Data
Sep. 14, 2017  (ES) ............................. ES201731066U

(51) Int. Cl.
*A47J 42/34*    (2006.01)
*A47G 19/24*    (2006.01)

(52) U.S. Cl.
CPC .............. *A47J 42/34* (2013.01); *A47G 19/24* (2013.01)

(58) Field of Classification Search
CPC . A47J 42/08; A47J 42/04; A47J 42/34; A47G 19/24
USPC ...................................................... 241/169.1
See application file for complete search history.

(56) References Cited

U.S. PATENT DOCUMENTS

| 7,878,437 B2 * | 2/2011 | Rice ......................... A47J 42/04 241/189.1 |
| 2004/0182958 A1 | 9/2004 | Herren |
| 2006/0278746 A1 | 12/2006 | Delbridge et al. |
| 2009/0256016 A1 * | 10/2009 | Lauzet .................... A47J 42/18 241/169.1 |
| 2010/0187343 A1 | 7/2010 | Stasin |

OTHER PUBLICATIONS

International Search Report of PCT/ES2018/070597, dated Dec. 21, 2018.

* cited by examiner

*Primary Examiner* — Faye Francis
(74) *Attorney, Agent, or Firm* — Collard & Roe, P.C.

(57) ABSTRACT

A grinding device for containers dispensing food products, which includes means for selectively adjusting the distance between blades and teeth and thereby selecting at will the desired grain size for grinding. The device has a static piece that is coupled to the neck of the container and is connected to a rotary piece such that the fixed piece includes a series of teeth which, together with blades projecting from the bottom face of the rotary piece, constitute the grinding mechanism of the device. The device includes, on the outside of the fixed piece, two or more channels that guide the rotation and axial retention of the rotary piece, while the rotary piece contains projections for fitting into the channels of the fixed piece.

1 Claim, 1 Drawing Sheet

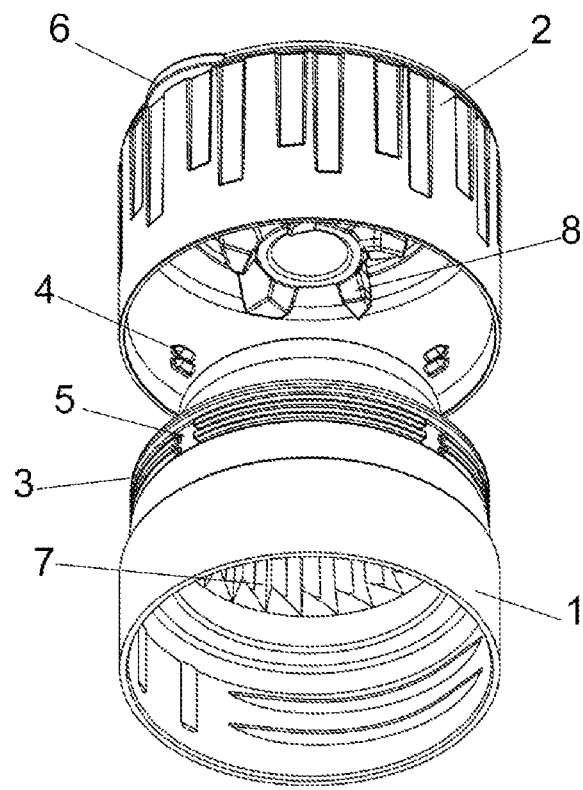
FIG. 1
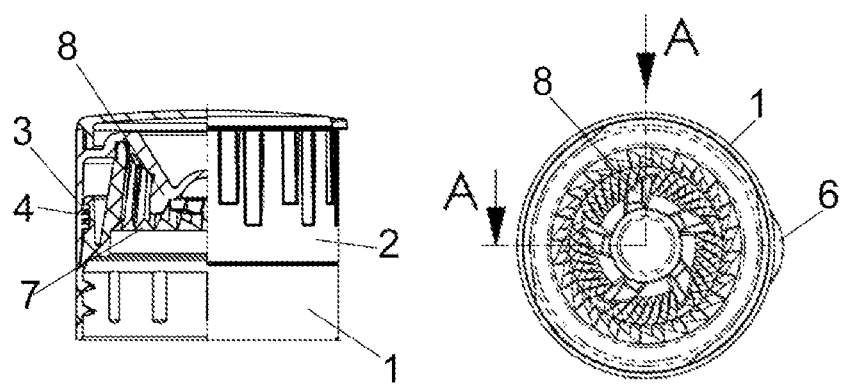
FIG. 3
A-A
FIG. 2

GRINDING DEVICE FOR SPICE-DISPENSING CONTAINERS

CROSS REFERENCE TO RELATED APPLICATIONS

This application is the National Stage of PCT/ES2018/070597 filed on Sep. 12, 2018, which claims priority under 35 U.S.C. § 119 of Spanish Application No. U201731066 filed on Sep. 14, 2017, the disclosure of which is incorporated by reference. The international application under PCT article 21(2) was not published in English.

OBJECT OF THE INVENTION

The present invention relates to a grinding device for a dispensing container of the type constituted from a jar containing foods and a piece coupled thereto on the mouth of the jar, which integrates the grinder in charge of grinding.

The object of the invention is to provide a device that allows for different grinding sizes, such that the grain size of the ground food can be manually selected by carrying out for that purpose simple handling of the grinder, without the user having to apply excessive force or pressure.

BACKGROUND OF THE INVENTION

In the current state of the art manual spice grinders which, as a general rule, comprise a jar containing spices to which there is coupled a piece constituting the grinder, are well known. The user therefore manually operates the grinder to grind the spices contained in the jar, allowing said spices to come out through the opening or openings provided for that purpose.

Some known manual grinders are internally configured for modifying the grinding size, that is, they allow the user to select the grain size of the ground spices, obtaining a larger or smaller spice grain depending on the selection made by the user. However, these devices comprise internal mechanisms to allow for selecting the grain size which may put up different degrees of resistance to the adjustment of the grinder depending on the finish and precision in manufacturing the different pieces forming the device.

Therefore, if there is too much play between the pieces, the user must exert little pressure to adjust the grinding, easily losing control of the position of the pieces.

Conversely, when the coupling between the pieces presents little play, the grinder will be rigid and forces the user to exert excessive force for modifying the selection of the grain size, which likewise entails difficulties in the handling of same.

Additionally, the known internal mechanisms involve high manufacturing costs, either because the manufacturing involves the integration of a large number of pieces or because it requires comprehensive control of the manufacture to obtain a grinder that is easy to handle by the user applying optimal force.

Therefore, the dual grinding device for the spice grinder object of the present invention solves the problems set forth above, as the applicant has no knowledge of the existence in the state of the art of spice grinders presenting a simple adjustable grinding device, without internal mechanisms that make the production thereof more expensive, such that the operation of selecting the grain size of the spices is simple and does not require the user to apply excessive force or pressure.

DESCRIPTION OF THE INVENTION

The grinding device proposed in the present invention is particularly adapted for the field of manual grinders, preferably of the type containing spices, although its application is by no means limited to this field.

To that end, the device is based on the conventional structuring of devices of this type in which the grinder per se, which is manually operated, constitutes the piece for closing a container carrying spices, such as a jar or the like.

According to the invention, the piece or part defining the grinder per se comprises at least two pieces: a rotary piece provided with blades radially projecting into piece and a static piece provided with teeth projecting into the piece. Optionally, the grinder has a lid or adhesive film to be removed for its first use that prevents the contents of the grinder from coming out and is located on the rotary piece.

Therefore, the grains of the spice or substance located between teeth and blades are ground when the rotary piece is moved.

In turn, the static piece has at least two circumferential channels on its outer perimeter which serve as guide means for projections present in the inner part of the rotary piece which allow for the selection of the grain size of the spices.

Axial movement of the rotary piece is sufficient for selecting the desired grain size, such that the projections of the rotary piece move, going through passages included in the circumferential channels of the static piece, such that the rotary piece can rotate through another different channel, varying the distance between teeth and blades and, therefore, the grain size of the ground spice.

Once the grain size has been selected, the mentioned projections rotate through the selected circumferential channel, keeping the distance between blades and teeth constant.

Advantageously, this design of the grinding device allows a rapid and simple selection of the desired grinding grain size, without the user having to apply excessive force and pressure, which results in better handling and duration of the device, as it prevents excessively forcing same during handling.

Advantageously, the grinder object of the invention has a very intuitive use, which promotes an easy and rapid handling.

DESCRIPTION OF THE DRAWINGS

To complement the following description and for the purpose of helping to better understand the features of the invention according to a preferred practical embodiment thereof, a set of drawings is attached as an integral part of said description, in which the following is depicted with an illustrative and non-limiting character:

FIG. 1 shows a representation corresponding to an exploded perspective view of the grinding device object of the present invention.

FIG. 2 shows a bottom plan view of the assembly of the preceding figure duly assembled.

FIG. 3 finally shows a section view according to section line A-A of FIG. 2.

PREFERRED EMBODIMENT OF THE INVENTION

In view of the mentioned figures, it can be observed how the adjustable grinding device for spice-dispensing containers object of the present invention is obtained, as is conventional, from a static piece (1), intended for being coupled to the neck of the container with spices, not depicted in the drawings as it is conventional, which fixed piece is connected at the top to a rotary piece (2), such that, as is also conventional, the fixed piece includes in its top area a series of teeth (7) which, together with blades (8) projecting from the bottom face of the rotary piece (2), constitute the grinding means, said rotary piece (2) being finished at the top by means of the corresponding practicable lid (6), which is optional.

Based on the conventional structuring, the essence of the invention is focused on the fact that the device includes means for selectively adjusting the distance between blades (8) and teeth (7) and thereby selecting at will the desired grain size for grinding the spices or product in question.

To that end, it has been envisaged that there are established, on the outside of the fixed piece (1) and in correspondence with its top perimeter area, two or more circumferential channels (3) along the perimeter and parallel to one another which act as means for guiding the rotation and axial retention of the rotary piece (2), for which purpose it contains projections (4) that are suitable in terms of shape and dimensions for fitting into the channels (3).

It has been envisaged that there are established in a strategically distributed manner between the channels (3) as many vertical passages (5) as there are projections (4) in the rotary piece (2), such that when said projections (4) are facing the vertical passages (5), the rotary piece (2) can move vertically through these passages, upwards or downwards, i.e., adjusting the distance between blades (8) and teeth (7), and therefore perform the operation of selecting the desired grain size, such that once said adjustment point has been reached, slight rotation of the rotary piece (2) will cause the projections (4) to be stabilized in the selected channels (3), the device therefore being stabilized in said working position.

The invention claimed is:

1. A grinding device for a spice dispensing container, consisting of:
   a static piece configured for attachment to a neck of the spice dispensing container and having a series of teeth thereon, and
   a rotary piece connected to the static piece and having a plurality of blades projecting from a bottom face of the rotary piece,
   wherein a perimeter of the static piece has three or more circumferential channels that run around the perimeter and parallel to each other and are configured for guiding a rotation and axial retention of the rotary piece,
   wherein the rotary piece contains a plurality of pairs of adjacent projections, the projections of each pair being arranged one on top of the other in an axial direction of the rotary piece being configured for fitting into the channels, and
   wherein vertical passages are defined between the channels and are configured for receiving the projections so as to allow selective vertical movement between the rotary piece and the static piece, in order to adjust a distance between the blades and the teeth.

* * * * *